United States Patent
Lee et al.

(10) Patent No.: US 11,078,816 B2
(45) Date of Patent: Aug. 3, 2021

(54) OIL PUMP CONTROL VALVE

(71) Applicant: UNICK CORPORATION, Gyeongsangnam-do (KR)

(72) Inventors: Chang-Hoon Lee, Gyeongsangnam-do (KR); Eui-Dong Roh, Busan (KR); Jeong-Tae Kim, Jeollanam-do (KR); Ji-Hoon Park, Busan (KR); Yeong-Jin Jeong, Gyeongsangnam-do (KR); Jun-Hyo Park, Busan (KR)

(73) Assignee: UNICK CORPORATION, Gyeongsangnam-do (KR)

( * ) Notice: Subject to any disclaimer, the term of this patent is extended or adjusted under 35 U.S.C. 154(b) by 106 days.

(21) Appl. No.: 16/341,038

(22) PCT Filed: Feb. 13, 2017

(86) PCT No.: PCT/KR2017/001531
§ 371 (c)(1),
(2) Date: Apr. 10, 2019

(87) PCT Pub. No.: WO2018/070621
PCT Pub. Date: Apr. 19, 2018

(65) Prior Publication Data
US 2019/0234256 A1 Aug. 1, 2019

(30) Foreign Application Priority Data

Oct. 10, 2016 (KR) .......................... 10-2016-0130847
Oct. 10, 2016 (KR) .......................... 10-2016-0130848

(51) Int. Cl.
*F16K 31/06* (2006.01)
*F01M 1/16* (2006.01)
(Continued)

(52) U.S. Cl.
CPC ................ *F01M 1/02* (2013.01); *F01M 1/16* (2013.01); *F16K 11/07* (2013.01); *F16K 31/02* (2013.01);
(Continued)

(58) Field of Classification Search
CPC ..... F01L 2001/3443; F01L 2001/34426; F01L 2001/34476; F16K 31/0613; F16K 27/048;
(Continued)

(56) References Cited

U.S. PATENT DOCUMENTS 4,245,816 A 1/1981 Johnson
5,509,637 A * 4/1996 Leonard .................... F01L 9/10
251/129.16
(Continued)

FOREIGN PATENT DOCUMENTS

EP 1801366 A1 6/2007
EP 2462324 B1 5/2013
(Continued)

OTHER PUBLICATIONS

Extended European Search Report dated Sep. 27, 2019 for corresponding Eurpoean Application No. 17860617.4, 19 pages.
(Continued)

*Primary Examiner* — Long T Tran
(74) *Attorney, Agent, or Firm* — Kinney & Lange, P.A.

(57) ABSTRACT

Disclosed herein are an oil pump control valve and, specifically, an oil pump control valve allowing a discharge port and the inside of a solenoid part to communicate with each other through a spool so as to relieve pressure inside the solenoid part. A spool flow path, a vent hole, and a spool notch are formed so as to allow the solenoid part to communicate with the outside regardless of the flow of fluids when the valve is operated, thereby enabling the internal
(Continued)

pressure of the solenoid part to be relieved. In addition, the spool and a rod are integrated such that the axial misalignment of the spool can be prevented and a holder has different diameter such that the flow of fluids can be controlled even during an abnormal power shutdown.

10 Claims, 10 Drawing Sheets

(51) Int. Cl.
    *F01M 1/02*     (2006.01)
    *F16K 11/07*     (2006.01)
    *F16K 31/02*     (2006.01)

(52) U.S. Cl.
    CPC ..... *F16K 31/06* (2013.01); *F01M 2001/0238* (2013.01)

(58) Field of Classification Search
    CPC .... F16K 11/07; F16K 11/0716; F16K 27/029; F01M 1/02; F01M 1/16
    See application file for complete search history.

(56) References Cited

U.S. PATENT DOCUMENTS

| | | | |
|---|---|---|---|
| 2002/0134444 A1* | 9/2002 | Isobe | F16K 27/041 137/625.65 |
| 2005/0211317 A1 | 9/2005 | Kramer et al. | |
| 2008/0308757 A1 | 12/2008 | Nakai et al. | |
| 2010/0326552 A1 | 12/2010 | Suzuki et al. | |
| 2011/0194967 A1* | 8/2011 | Watanabe | F04C 14/226 418/138 |
| 2012/0234275 A1* | 9/2012 | Fischer | F01L 1/3442 123/90.17 |
| 2015/0027573 A1* | 1/2015 | Ochiai | F15B 13/0402 137/625.65 |
| 2015/0252803 A1* | 9/2015 | Ohnishi | F04C 2/344 418/26 |
| 2016/0061064 A1* | 3/2016 | Mukaide | F01L 1/3442 123/90.12 |
| 2019/0234244 A1* | 8/2019 | Hisaeda | F01L 1/022 |

FOREIGN PATENT DOCUMENTS

| | | |
|---|---|---|
| JP | 4900074 B2 | 3/2012 |
| JP | 2014037874 A | 2/2014 |
| JP | 2016070222 A | 5/2016 |
| KR | 100793868 B | 4/2008 |
| KR | 101167503 B | 7/2012 |

OTHER PUBLICATIONS

International Search Report dated Jul. 25, 2017 for corresponding PCT Application No. PCT/KR2017/001531.

* cited by examiner

OIL PUMP CONTROL VALVE

CROSS-REFERENCE TO RELATED APPLICATION(S)

This application is the national phase of PCT Application No. PCT/KR2017/001531 filed on Feb. 13, 2017, which in turn claims priority to Korean Application No. 10-2016-0130847 filed on Oct. 10, 2016 and to Korean Application No. 10-2016-013848 filed on Oct. 10, 2016, the disclosures of which are incorporated herein by reference in their entireties.

BACKGROUND

Technical Field

The present disclosure relates to an oil pump control valve. More particularly, the present disclosure relates to an oil pump control valve in which a pressure change inside a solenoid unit is reduced via communication between a discharge port and the solenoid unit through a spool, wherein a fail-safe function is achieved via a difference between an outer diameter of the spool on a control port and an outer diameter of the spool on a supply port.

Description of Related Art

An oil pump sucks oil stored in an oil pan and feeds the oil to each part of an engine when driving the engine. The oil pumped by the oil pump is applied to friction-causing parts to reduce a friction resistance and to prevent wear of the parts. The oil pump control system that controls the oil pump includes an oil pump control valve. The oil pump control valve largely includes a valve unit which controls flow of fluid and a solenoid unit which controls the valve unit. Further, the solenoid unit has a coil for generating a magnetic field, a core for transmitting the magnetic field generated by the coil, and a plunger for reciprocating via the magnetic field transmitted to the core. The valve unit has a spool. When the plunger reciprocates, the spool reciprocates along with the plunger. In this connection, the movement of the spool may allow the fluid to be introduced into or discharged from the valve unit. In a conventional oil pump control valve, there is no structure for removing a problem result from an internal pressure change in the solenoid unit. As the plunger descends, the pressure increases in the solenoid due to the fluid introduced into the solenoid unit. When the plunger rises, the pressure inside the solenoid unit decreases. As described above, the conventional oil pump control valve has a problem that the pressure change inside the solenoid unit is not reduced and, thus, the resistance against the plunger rise and fall occurs. Thus, the return motion of the plunger and the spool is adversely affected.

Further, the conventional oil pump control valve may operate when external power is applied thereto, but it does not operate when external power is cut off due to an failure. In this case, when only the oil pump control valve stops, and when an entire system is operating, a pressure in the oil pump control system rises abnormally because the oil pump control valve does not discharge fluid. In this way, the existing oil pump control valve cannot control the fluid pressure when the abnormal power supply cut off occurs. This may adversely affect the oil pump control system.

SUMMARY

Technical Purposes

One purpose of the present disclosure is to provide an oil pump control valve that may reduce an internal pressure change.

Another purpose of the present disclosure is to provide an oil pump control valve that may control flow of fluid when abnormal power shutdown occurs.

Technical Solutions

In one aspect of the present disclosure, there is provided a valve device for controlling an oil pump, the device comprising: a valve unit having a holder and a spool disposed in the holder, where the value unit is configured for controlling flow of fluid; and a solenoid unit configured for controlling the spool, wherein the spool includes: a rod-shaped spool body; a ring-shaped first land disposed on a top portion of the spool body, wherein the first land has an open top; a ring-shaped second land disposed on a middle portion of the spool body; a ring-shaped third land disposed on a lower portion of the spool body; a vent hole defined in the spool body and disposed between the second land and the third land; a spool fluid channel defined in the spool body to communicate the vent hole and the open top of the first land with each other; and a spool notch partially defined in a lateral portion of the third land.

In another aspect of the present disclosure, there is provided a valve device for controlling an oil pump, the device comprising: a valve unit including: a hollow holder, wherein the holder has a discharge port defined in a top portion thereof, a control port defined in a middle portion thereof, and a supply port defined in a lower portion thereof, wherein an inner diameter of a portion of the holder in which the control port is defined is larger than an inner diameter of a portion of the holder in which the supply port is defined; and a spool having ring-shaped first and second lands, wherein the first and second lands are vertically spaced from each other and contact an inner face of the holder; and a solenoid unit configured for controlling a movement of the spool.

In one embodiment, the spool includes: a rod-shaped spool body; a ring-shaped first land disposed on a top portion of the spool body, wherein the first land has an open top; a ring-shaped second land disposed on a middle portion of the spool body, wherein an outer diameter of the first land is larger than an outer diameter of the second land; a ring-shaped third land disposed on a lower portion of the spool body, wherein an outer diameter of the third land is equal to the outer diameter of the second land; a vent hole defined in the spool body and disposed between the second land and the third land; a spool fluid channel defined in the spool body to communicate the vent hole and the open top of the first land with each other; and a spool notch partially defined in a lateral portion of the third land.

In one embodiment, the holder has a supply port defined therein for supplying the fluid, and a control port defined therein for receiving and discharging the supplied fluid, wherein the first land is constructed to control communication between the supply port and the control port, wherein the second land is constructed to prevent the fluid supplied from the supply port from entering the solenoid unit.

In one embodiment, the spool includes a rod integral with the spool body, wherein the rod extends from a bottom of the third land.

In one embodiment, the solenoid unit includes: a bobbin; a coil wound around the bobbin; a core disposed in the bobbin; and a plunger disposed in the core; wherein the rod contacts the plunger, wherein an inner diameter of a portion of the core where the rod is inserted is larger than an outer diameter of the rod.

In one embodiment, the plunger has a fluid channel defined therein in a longitudinal direction thereof, wherein a location of the fluid channel is deviated from a center point of a cross section of the plunger.

Technical Effects

According to the present disclosure, when the valve actuates, the spool fluid channel, vent hole and spool notch may allow the solenoid unit to communicate with the outside of the value regardless of the fluid flow, thereby to reduce the internal pressure change of the solenoid unit.

Further, according to the present disclosure, the spool body and rod which may be monolithic may prevent axial misalignment between the spool body and rod.

Further, according to the present disclosure, outer diameters of portions of the spool may different from each other, to allow the valve to control the flow of the fluid during abnormal power cut off.

DETAILED DESCRIPTIONS

Figure 1:
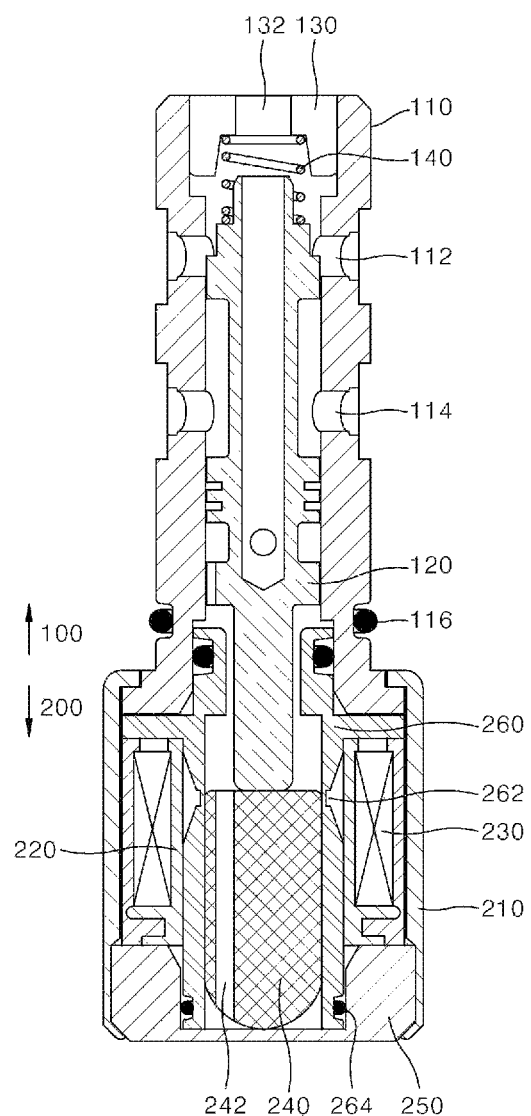
FIG. 1 is a cross-sectional view of an oil pump control valve according to a first embodiment of the present disclosure.

Hereinafter, an embodiment of the present disclosure will be described in detail with reference to the drawings.

However, the present disclosure is not limited to embodiments disclosed below, but may be embodied in various forms. These embodiments merely allow the present disclosure to be complete, and are provided to fully illustrate the scope of the present disclosure to those skilled in the art. Like reference numerals refer to like elements herein.

FIG. 1 is a cross-sectional view of an oil pump control valve according to a first embodiment of the present disclosure.

The oil pump control valve according to the first embodiment of the present disclosure includes a valve unit 100 for control an oil flow and a solenoid unit 200 for actuating the valve unit 100, as shown in FIG. 1.

The valve unit 100 introduces fluid therein and discharges therefrom under control of the solenoid unit 200. To this end, the valve unit 100 includes a holder 110, a spool 120 movably mounted within the holder 110, an adjusting screw 130 disposed above the spool 120 and coupled to the holder 110, and a spring 140 interposed between the spool 120 and the adjusting screw 130.

The holder 110 extends from a top of the valve unit 100 to a bottom thereof contacting the solenoid unit 200 and has a hollow pipe shape having an open top and an open bottom. A supply port 114 through which oil is supplied is defined in a middle side portion of the holder 110. A control port 112 is defined in an upper side portion to control the oil introduced through the supply port 114 to be controlled to have a predetermined pressure. Further, an O-ring 116 for preventing leakage of oil is provided on an outer circumferential face of a lower side portion of the holder 110. Further, the adjusting screw 130 is disposed in the open top of the holder 110. The adjusting screw 130 has a discharge port 132 defined therein. The discharge port 132 discharges a portion the oil introduced from the supply port 114, a portion of the oil introduced from the control port 112 into an external part, that is, an oil pan (not shown). Further, the spring 140 is installed beneath the adjusting screw 130. The adjusting screw 130 controls an elasticity of the spring 140 supporting the spool 120 to control a travel distance and travel speed of the spool 120. Preferably, the adjusting screw 130 may be screwed to the open top of the holder 110 so as to finely adjust the elasticity of the spring 140.

Figure 2:
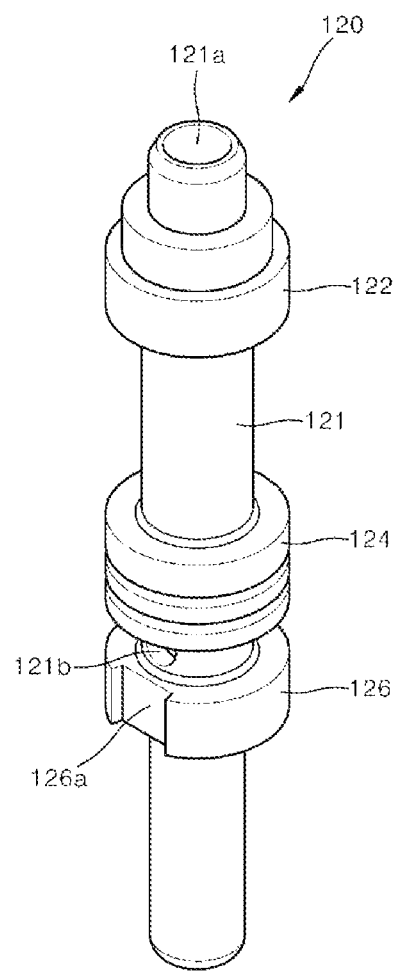
FIG. 2 is a perspective view of a spool in an oil pump control valve according to the first embodiment of the present disclosure.
Figure 3:
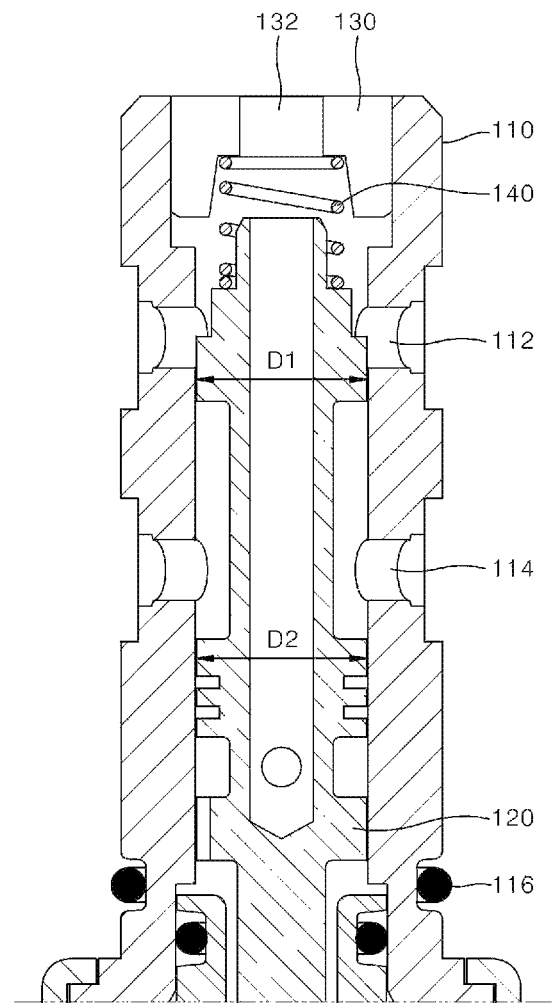
FIG. 3 is a cross-sectional view of a spool in an oil pump control valve according to the first embodiment of the present disclosure.

FIG. 2 is a perspective view of a spool in an oil pump control valve according to the first embodiment of the present disclosure. FIG. 3 is a cross-sectional view of the spool in an oil pump control valve according to the first embodiment of the present disclosure.

The spool 120 is mounted in the holder 110 to vertically translate to selectively communicate between the supply port 114, the control port 112, and the discharge port 132. As shown in FIG. 2, the spool 120 has a spool body 121 extending in the longitudinal direction of the holder 110. The spool body 121 may be formed as a multi-stage rod in which multi-stages have outer diameters different from each other. In this connection, a first land 122, a second land 124, and a third land 126 are respectively formed on a top portion, a middle portion, and a lower portion of the spool body 121. A portion of the spool body 121 below the third land 126 is defined as a bottom rod. A vent hole 121b is defined in the spool body 121 between the second land 124 and the third land 126. A spool discharge port 121a is defined in a top of the spool body 121. The spool body 121 has a spool fluid channel defined therein communicating the spool discharge port 121a and the vent hole 121b. Further, in a lateral portion of the third land 126, a spool notch 126a is defined for communicating an inner space of the solenoid unit 200 with the vent hole. In this connection, as shown in FIG. 3, an outer diameter D1 of the first land 122 and an outer diameter D2 of the second land 124 are equal to each other. An outer diameter of the third land 126 is equal to each of those of the first land 122 and second land 124. Further, a diameter of the spool fluid channel may be equal to each of those of the first land 122, second land 124, and third land 126. Details of such a spool 120 are illustrated below.

The first land 122 is formed in a ring shape on the top portion of the spool body 121 having a rod shape having an uniform diameter. The first land 122 includes two sub-lands formed in a stepped manner and having different outer diameters. In this connection, the first land 122 includes an upper sub-end with a small outer diameter and a lower sub-end with a large outer diameter. There is present a tip portion of the spool body 121 above the upper sub-end. In this connection, an profile of the discharge port 132 defined in the adjusting screw 130 conforms to a profile of a combination of the upper sub-end and the tip portion of the spool body 121.

The second land 124 is disposed on the middle portion of the spool body 121. An outer diameter of the second land 124 is equal to an outer diameter of the lower sub-land of the first land 122. Further, at least one groove is defined in the second land 124 and along the outer circumference of the second land 124. In this connection, the groove may be called a second land groove. The second land grooves may be vertically spaced apart from each other and each groove be defined along the outer circumferential surface of the second land 124.

The third land 126 is disposed on the lower portion of the spool body 121. The third land 126 is embodied as a ring having an outer diameter equal to that of the second land 124 as described above. Further, a spool notch 126a is defined in a lateral portion of the third land 126. The notch 126a may be defined by partially removing the lateral portion of the third land 126. Further, in FIG. 2, a main face of the spool notch 126a (a plane indicated by a numeral 126a in FIG. 2) is shown as to be flat. However, the present disclosure is not limited thereto. In another example, a plurality of slits horizontally spaced apart from each other may be defined in the main face of the spool notch 126a. Each slit may extend in the longitudinal direction of the spool body 121. In another example, a plurality of slits may be oriented to be inclined toward the vent hole 121b. Furthermore, although two opposite lateral walls around the main face of the spool notch 126a are shown as being parallel in FIG. 2, the present disclosure is not limited thereto. In another example, a spacing between the two side walls may decrease toward the vent hole 121b.

The bottom rod is in direct contact with a plunger 240 to move the spool 120 as the plunger 240 moves. In this connection, the present disclosure states that the bottom rod is integral with the spool body 121 to form a single spool 120. Accordingly, when power is applied to the solenoid unit 200, an axis of the spool body 121 and an axis of the bottom rod may vertically coincide with each other during the reciprocating motion thereof. Further, when the bottom rod and the spool body 121 are integral with each other, an axis of the spool body 121 and an axis of the bottom rod may vertically coincide with each other even when removing the third land 126 as described above.

In the spool 120 having the above construction, the first land 122, the second land 124, and the third land 126 may contact the inner fluid channel of the holder 110 to guide the movement of the spool body 121. In particular, the first land 122 contacts a upper or lower portion of the control port 112 when the spool 120 moves, thereby controlling the communication of the control port 112. For example, When the spool 120 rises, the first land 122 may enable communication between the supply port 114 and control port 112 and may disable communication between the control port 112 and the discharge port 132. Further, when the spool 120 moves down, the communication between the supply port 114 and the control port 112 may be disabled via the first land while the communication between the control port 112 and discharge port 132 may be enabled via the first land 122.

The solenoid unit 200 controls the spool 120 by reciprocating the spool 120 of the valve unit 100 in the holder 110. The solenoid unit 200 may include a casing 210, a bobbin 220 mounted inside the casing 210, a coil 230 wound around an outer peripheral surface of the bobbin 220, a core 260, a plunger 240 mounted in the core 260, and a cover 250 mounted to a bottom end of the casing 210.

The casing 210 has a hollow pipe shape with a top and bottom as open. A housing space is defined inside the casing 210. The bobbin 220 is mounted in the housing space. A bottom portion of the casing 210 may be curled to enclose the cover 250. When curling the bottom portion of casing 210, the bobbin 220 and the cover 250 may press against a flange of the core 260 (the flange extending from a top of the core to a top of the bobbin), and thus, may prevent movements of components mounted inside the casing 210. Thus, foreign substances may be prevented from flowing into the bottom portion of the casing 210. Further, the top portion of the casing 210 may also be curled. This may prevent the holder 110 from separating from the solenoid unit 200 or moving.

The bobbin 220 is hollow and has a shape conforming to that of the spool 120. The coil 230 is wound around the outer circumferential surface of the bobbin 220. When the power is applied to the solenoid unit 200, a magnetic field generated by the coil 230 raises the plunger 240 in the core 260. In this connection, an intensity of the magnetic field is proportional to a intensity of current flowing along the coil 230 and the number of windings of the coil 230 wound on the bobbin 220. Therefore, when a large current is applied to the coil 230 or the winding number increases, the strong magnetic field may be generated to reliably control the movement of the plunger 240.

The core 260 acts for inducing the magnetic field to be generated in the coil 230. A magnetic force induction groove 262 is defined in an outer peripheral face of a middle portion of the core 260. An O-ring 264 for preventing fluid leakage is disposed on an outer circumferential surface of each of the top portion and the lower portion of the core 260.

The magnetic force induction groove 262 is intended to ensure sufficient magnetic force to effectively control fluid at a high pressure and a high flow rate. As shown in FIG. 1, the middle portion of the core 260 in which the magnetic force induction groove 262 is defined may be thinner than the upper and lower portions thereof. With this configuration, the magnetic field generated from the coil 230 when the power is applied thereto is induced along the core 260, but is concentrated on the magnetic force induction groove 262 where the wall of the core is relatively thin. This is based on the principle that a density of magnetic flux rises as an area of an object in which the magnetic field is generated decreases. The magnetic force induction groove 262 in accordance the present disclosure has a tapered shape in which a thickness of the wall gradually becomes smaller toward a center point, so that the magnetic field may be more effectively concentrated thereon. Accordingly, the plunger 240 moved using the magnetic field may be controlled more precisely to control the fluid at the high pressure and high flow rate.

The plunger 240 is a movable iron core that reciprocates in the core 260 via a magnetic field generated by the coil 230. The plunger 240 contacts the lower portion of the spool 120. The plunger 240 has a plunger fluid channel 242 defined therein passing through the plunger 240 vertically. The plunger fluid channel 242 transfers oil filled in a space above the plunger 240 below the plunger 240 or transfers oil filled in a space below the plunger 240 above the plunger 240 when the plunger 240 reciprocates. In this connection, the plunger fluid channel 242 is defined to be eccentric by a predetermined distance from a center point of the plunger 240, thereby to prevent the plunger fluid channel 242 from being closed by the bottom rod of the spool body 121 when the plunger contacts the spool 120. Further, a bottom portion of the plunger 240 is defined to be curved. This thus makes a local face contact between the plunger and the bottom of the cover 250. When the plunger 240 and the cover 250 make the local face contact each other, a direct flow of the magnetic field from the plunger 240 to the cover 250 may be disabled so that the plunger 240 can smoothly rise. Further, the bottom face of the cover 250 is slightly inclined, this does not affect a slope of the plunger 240, to eliminate a frictional resistance due to an inclination of the plunger 240. In one example, nickel may be electroless-plated on a surface of such a plunger 240 to reduce friction during movement thereof. Further, an inner circumferential face portion of the core 260, particularly, at a location thereof contacting the plunger 240 may be softened.

Figure 4:
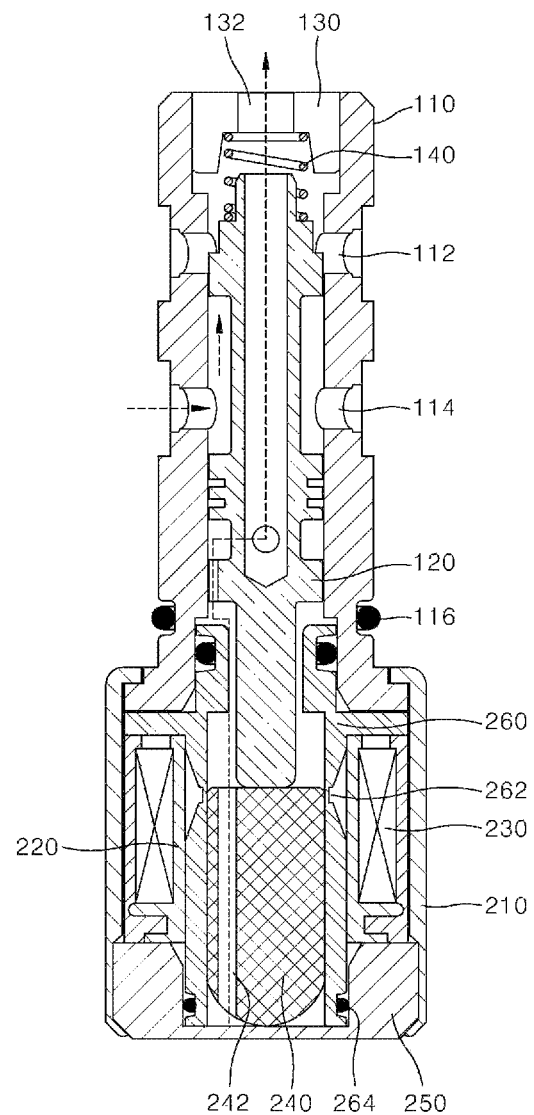
FIG. 4 and FIG. 5 are cross-sectional views to illustrate actuations of the oil pump control valve according to the first embodiment of the present disclosure.
Figure 5:
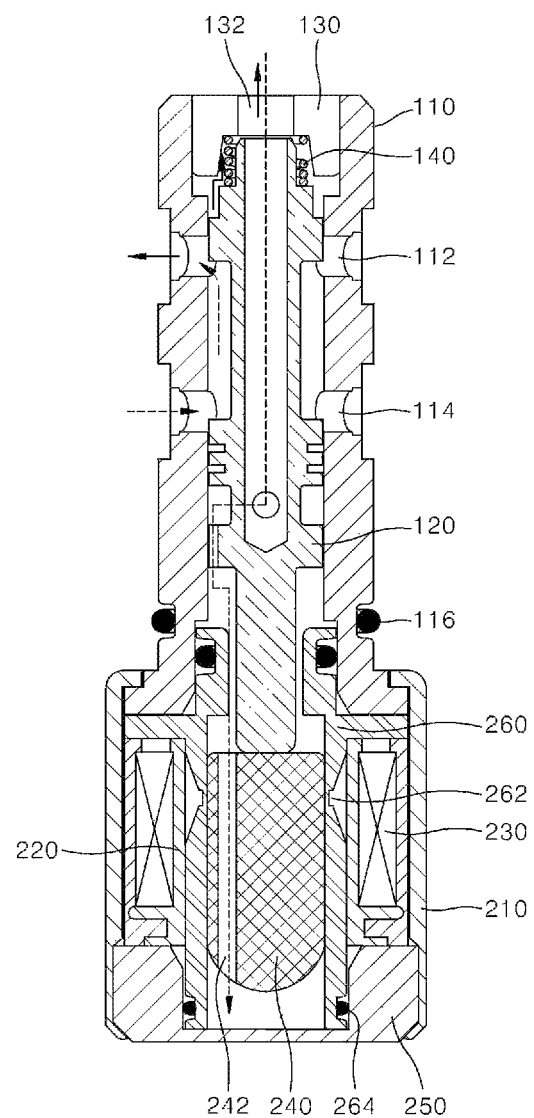

FIG. 4 and FIG. 5 are cross-sectional views to illustrate an actuation of the oil pump control valve according to the first embodiment of the present disclosure.

As shown in FIG. 4, in the oil pump control valve according to the first embodiment of the present disclosure, when the solenoid unit 200 is not powered, a magnetic field is not induced in the core 260 via the bobbin 220. Accordingly, the plunger 240 does not rise. The spool 120 located on the plunger 240 also does not rise. That is, the first land 122 of the spool 120 is positioned such that the supply port 114 and the control port 112 in the holder 110 are not communicated with each other. The second land 124 is located below the supply port 114. At this time, an inside of the core 260 may be maintained at a communicated state with the outside of the valve through the plunger fluid channel 242, the spool notch 126a, the vent hole 121b, the spool fluid channel, and the discharge port 132. In one example, in order for the plunger fluid channel 242 and spool notch 126a to communicate with each other, an inner diameter of the core at a region where the bottom rod is inserted should be larger than an outer diameter of the bottom rod.

Then, when power is applied to the solenoid unit 200, a magnetic field is induced in the core 260 via the bobbin 220, and, thus, the plunger 240 rises as shown in FIG. 5. Accordingly, the spool 120 positioned on the plunger 240 is raised. As the spool 120 rises, vertical levels of the first land 122, second land 124, and third land 126 change. That is, the first land 122 is located above the control port 112, and the second land 124 is located below the supply port 114. Accordingly, the supply port 114 and the control port 112 in the holder 110 are communicated with each other. Thus, the fluid supplied from the supply port 114 is discharged through the control port 112. At this time, the inside of the core 260 communicates with the outside of the valve through the plunger fluid channel 242, the spool notch 126a, the vent hole 121b, the spool fluid channel, and the discharge port 132. Thus, the fluid flows into the core 260 through the discharge port 132 when the plunger 240 rises up. Thus, a pressure change in the core 260 may be reduced. Therefore, when the plunger 240 rises, the pressure change inside the core 260 may be lowered, thereby allow the plunger 240 to rise easily.

Further, when the solenoid unit 200 is supplied with power as described above, and then the power is not supplied again, the magnetic field causing the rising of the plunger 240 disappears. Further, the spool 120 is pressed down by the spring 140 interposed between the adjusting screw 130 and the first land 122 of the holder 110. As a result, the spool 120 descends, such that the ascended plunger 240 descends again. At this time, the fluid that has flowed in the core 260 and below the plunger 240 is discharged through the plunger fluid channel 242, the spool notch 126a, the vent hole 121b, the spool fluid channel, and the discharge port 132. Therefore, this may allow the plunger 240 to descend easily and fully. Otherwise, the plunger 240 may not descend fully due to the fluid that has flowed into the core 260 when the plunger 240 is descending.

As described above, according to the present embodiment, when the valve is actuated, the spool fluid channel, vent hole, and spool notch may allow the solenoid unit to communicate with the outside of the value regardless of the fluid flow, thereby to reduce the internal pressure of the solenoid unit. Further, in this embodiment, integrating the spool body and the bottom rod each other may prevent the axis non-coincidence between the spool body and the bottom rod.

A following is a description of an oil pump control valve according to a second embodiment of the present disclosure with reference to the drawings. The same contents as those of the oil pump control valve according to the first embodiment of the present disclosure as described above will be omitted or briefly illustrated. Further, the configuration of the oil pump control valve according to the first embodiment of the present disclosure as described above may be applied to the second embodiment as described below.

Figure 6:
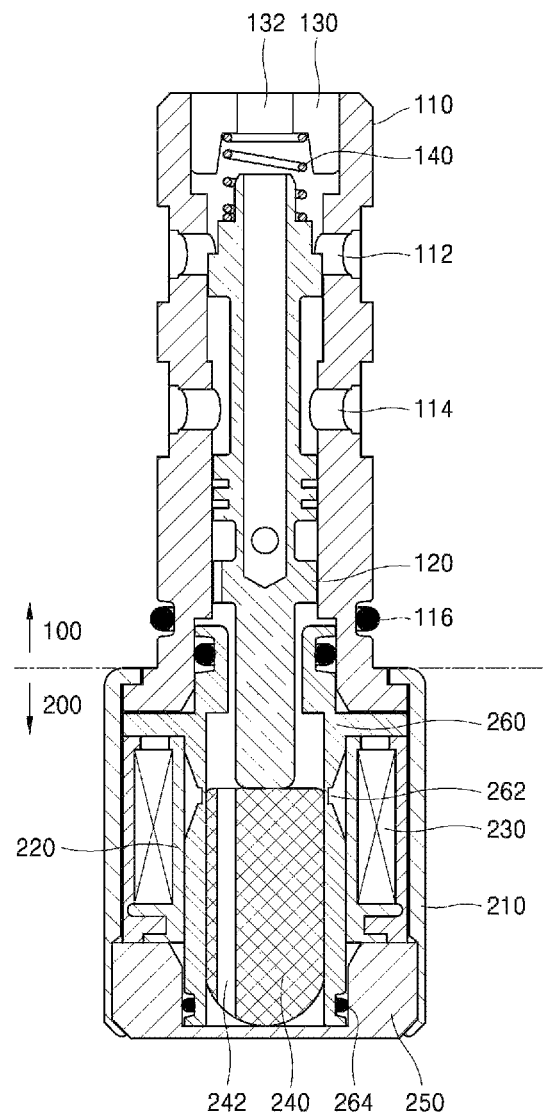
FIG. 6 is a cross-sectional view of an oil pump control valve according to a second embodiment of the present disclosure.

FIG. 6 is a cross-sectional view of an oil pump control valve according to the second embodiment of the present disclosure.

The oil pump control valve according to the second embodiment of the present disclosure includes a valve unit 100 for control an oil flow and a solenoid unit 200 for actuating the valve unit 100, as shown in FIG. 1. In this connection, the configuration of the solenoid unit 200 in this embodiment is the same as that of the first embodiment as described above. Thus, descriptions thereof are omitted.

The valve unit 100 introduces fluid therein and discharges therefrom under control of the solenoid unit 200. To this end, the valve unit 100 includes a holder 110, a spool 120 movably mounted within the holder 110, an adjusting screw 130 disposed above the spool 120 and coupled to the holder 110, and a spring 140 interposed between the spool 120 and the adjusting screw 130. In this connection, the configuration of the holder 110 in this embodiment is the same as that in the first embodiment as described above. Thus, descriptions thereof are omitted.

Figure 7:
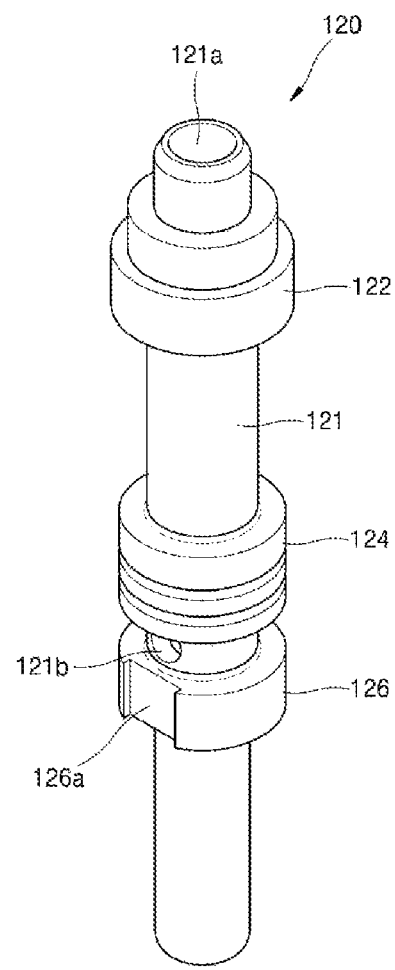
FIG. 7 is a perspective view of a spool in an oil pump control valve according to the second embodiment of the present disclosure.
Figure 8:
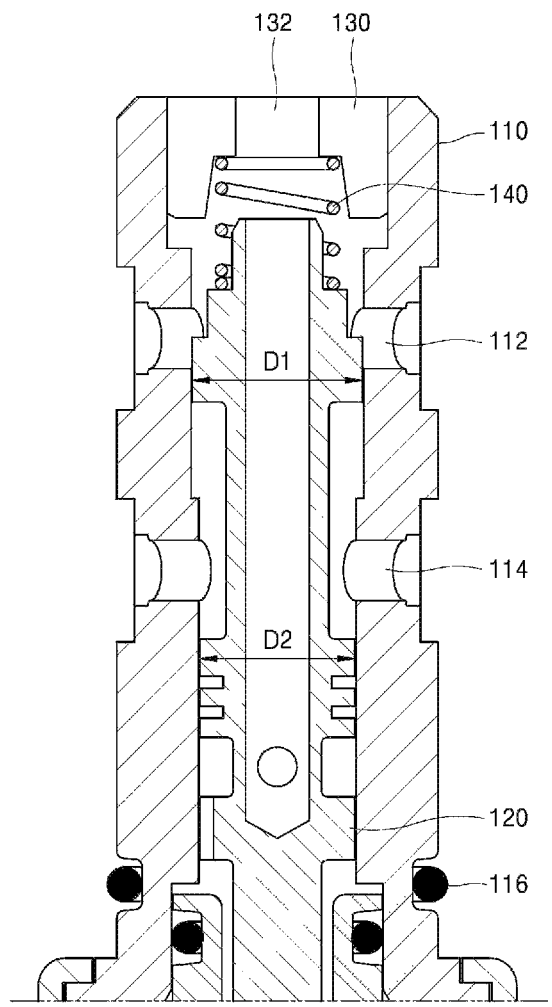
FIG. 8 is a cross-sectional view to illustrate a spool in an oil pump control valve according to the second embodiment of the present disclosure.

FIG. 7 is a perspective view of a spool in an oil pump control valve according to the second embodiment of the present disclosure. FIG. 8 is a cross-sectional view of the spool in an oil pump control valve according to the second embodiment of the present disclosure.

The spool 120 is mounted in the holder 110 to vertically translate to selectively communicate between the supply port 114, the control port 112, and the discharge port 132. As shown in FIG. 2, the spool 120 has a spool body 121 extending in the longitudinal direction of the holder 110. The spool body 121 may be formed as a multi-stage rod in which multi-stages have outer diameters different from each other as shown in FIG. 7. In this connection, a first land 122, a second land 124, and a third land 126 are respectively formed on a top portion, a middle portion, and a lower portion of the spool body 121. A portion of the spool body 121 below the third land 126 is defined as a bottom rod. In this connection, a configuration of the bottom rod in this embodiment is the same at that in the first embodiment. A vent hole 121*b* is defined in the spool body 121 between the second land 124 and the third land 126. A spool discharge port 121*a* is defined in a top of the spool body 121. The spool body 121 has a spool fluid channel defined therein communicating the spool discharge port 121*a* and the vent hole 121*b*. Further, in a lateral portion of the third land 126, a spool notch 126*a* is defined for communicating an inner space of the solenoid unit 200 with the vent hole. In this connection, configurations of the first land 122 and the second land 126 in this embodiment are the same as those in the first embodiment as described above.

The second land 124 is disposed on the middle portion of the spool body 121. An outer diameter of the second land 124 is smaller to an outer diameter of the first land 122. Further, at least one groove is defined in the second land 124 and along the outer circumference of the second land 124. In this connection, the groove may be called a second land groove. The second land grooves may be vertically spaced apart from each other and each groove be defined along the outer circumferential surface of the second land 124.

In this connection, as shown in FIG. 8, an outer diameter D1 of the first land 122 and an outer diameter D2 of the second land 124 are different from each other. Accordingly, an inner diameter of the holder defined by the first land 122, i.e., an inner diameter of a portion of the holder where the control port 112 is defined is different from an inner diameter of the holder defined by the second land 124, i.e., an inner diameter of a portion of the holder where the supply port 114 is defined. In this connection, the inner diameter of the portion of the holder in which the control port 112 is defined is larger than the inner diameter of the portion of the holder in which the supply port 114 is defined. Accordingly, in accordance with the present disclosure, when the supply port 114 is supplied with fluid at a certain pressure or greater, the spool 120 rises due to the pressure difference of the fluid and thus the fluid is discharged to the control port 112 even when the solenoid unit is not powered.

In the spool 120 having the above construction in this embodiment, as in the first embodiment, the first land 122, the second land 124, and the third land 126 may contact the inner fluid channel of the holder 110 to guide the movement of the spool body 121. In particular, the first land 122 contacts a upper or lower portion of the control port 112 when the spool 120 moves, thereby controlling the communication of the control port 112. For example, when the spool 120 rises, the first land 122 may enable communication between the supply port 114 and control port 112 and may disable communication between the control port 112 and the discharge port 132. Further, when the spool 120 moves down, the communication between the supply port 114 and the control port 112 may be disabled via the first land while the communication between the control port 112 and discharge port 132 may be enabled via the first land 122.

Figure 9:
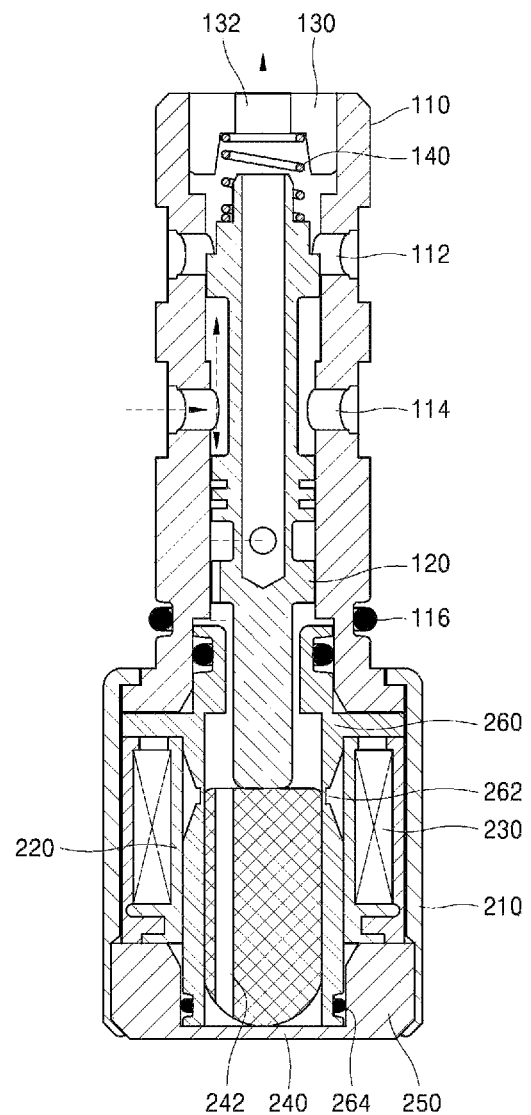
FIG. 9 and FIG. 10 are cross-sectional views to illustrate actuations of the oil pump control valve according to the second embodiment of the present disclosure.
Figure 10:
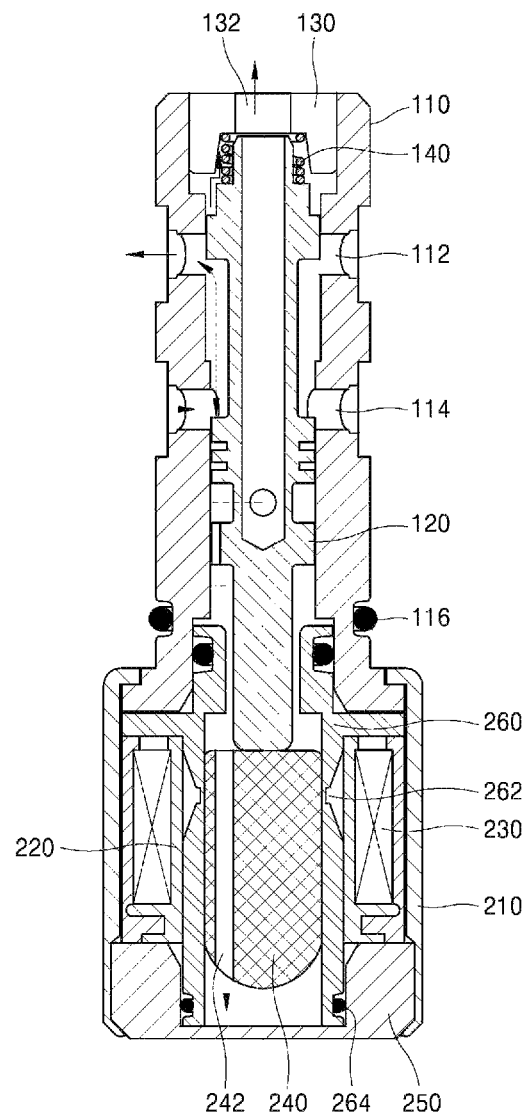

FIG. 9 and FIG. 10 are cross-sectional views to illustrate an actuation of the oil pump control valve according to the second embodiment of the present disclosure.

As shown in FIG. 9, in the oil pump control valve according to the second embodiment of the present disclosure, when the solenoid unit 200 is not powered, a magnetic field is not induced in the core 260 via the bobbin 220. Accordingly, the plunger 240 also does not rise. The spool 120 located on the plunger 240 also does not rise. That is, the first land 122 of the spool 120 is positioned such that the supply port 114 and the control port 112 in the holder 110 are not communicated with each other. The second land 124 is located below the supply port 114. At this time, an inside of the core 260 may be maintained at a communicated state with the outside of the valve through the plunger fluid channel 242, the spool notch 126*a*, the vent hole 121*b*, the spool fluid channel, and the discharge port 132. In one example, in order for the plunger fluid channel 242 and spool notch 126*a* to communicate with each other, an inner diameter of the core at a region where the bottom rod is inserted should be larger than an outer diameter of the bottom rod.

Then, when power is applied to the solenoid unit 200, a magnetic field is induced in the core 260 via the bobbin 220, and, thus, the plunger 240 rises as shown in FIG. 10. Accordingly, the spool 120 positioned on the plunger 240 is raised. As the spool 120 rises, vertical levels of the first land 122, second land 124, and third land 126 change. That is, the first land 122 is located above the control port 112, and the second land 124 is located below the supply port 114. Accordingly, the supply port 114 and the control port 112 in the holder 110 are communicated with each other. Thus, the fluid supplied from the supply port 114 is discharged through the control port 112. At this time, the inside of the core 260 communicates with the outside of the valve through the plunger fluid channel 242, the spool notch 126*a*, the vent hole 121*b*, the spool fluid channel, and the discharge port 132. Thus, the fluid flows into the core 260 through the discharge port 132 when the plunger 240 rises up. Thus, a pressure change in the core 260 may be reduced. Therefore, when the plunger 240 rises, the pressure change inside the core 260 may be lowered, thereby allow the plunger 240 to rise easily.

Further, when the solenoid unit 200 is supplied with power as described above, and then the power is not supplied again, the magnetic field causing the rising of the plunger 240 disappears. Further, the spool 120 is pressed down by the spring 140 interposed between the adjusting screw 130 and the first land 122 of the holder 110. As a result, the spool 120 descends, such that the ascended plunger 240 descends again. At this time, the fluid that has flowed in the core 260 and below the plunger 240 is discharged through the plunger fluid channel 242, the spool notch 126*a*, the vent hole 121*b*, the spool fluid channel, and the discharge port 132. Therefore, this may allow the plunger 240 to descend easily and fully. Otherwise, the plunger 240 may not descend fully due to the fluid that has flowed into the core 260 when the plunger 240 is descending.

Further, after the power to the solenoid unit 200 is intentionally cut off, the power to the solenoid unit 200 may be accidently cut off due to a failure or the like. In this case, the plunger 240 does not rise. At this time, when only the power to the solenoid unit 200 is cut off, and when, the fluid is being supplied to the supply port 114, the plunger 240 does not rise, so that the fluid supplied to the supply port 114 cannot be discharged to the control port 112. This is the case in the first embodiment, However, in the second embodiment of the present disclosure, the inner diameter of the portion of the holder 110 in which the control port 112 is defined is larger than the inner diameter of the portion of the holder 110 in which the supply port 114 is defined. Thus, as the pressure of the fluid supplied to the supply port 114 gradually increases, the fluid supplied to the supply port 114 at a high pressure presses a fluid at a low pressure in a space by defined by the first land 122 of the spool 120 such that the spool 120 is raised up. Then, the fluid supplied to the supply port 114 is discharged to the control port 112, and, thus, the pressure of the fluid in the supply port 114 is lowered.

Further, as the pressure of the fluid in the supply port 114 decreases, the spool 120 which has risen descends. Then, when the pressure of the fluid in the supply port 114 rises, the spool may rise up again. Thus, the spool 120 repeats the process of ascending and descending process. This process may be called a fail-safe function. In accordance with the present disclosure, the fail-safe function may be achieved via the different outer diameters of the portions of the spool 120.

As described above, in this embodiment, the outer diameters of the portions of the spool may be different from each other to allow the valve to control the flow of the fluid even when the abnormal power cut off occurs.

Although the present disclosure has been described with reference to the drawings and embodiments, it will be understood by those skilled in the art that various changes in form and details may be made thereto without departing from the spirit and scope of the present disclosure as set forth in the following claims.

What is claimed is:

1. A valve device for controlling an oil pump, the device comprising:
   a valve unit having a holder and a spool disposed in the holder, where the valve unit is configured for controlling flow of fluid; and
   a solenoid unit configured for controlling the spool,
   wherein the spool includes:
      a rod-shaped spool body;
      a ring-shaped first land disposed on a top portion of the spool body, wherein the first land has an open top;
      a ring-shaped second land disposed on a middle portion of the spool body;
      a ring-shaped third land disposed on a lower portion of the spool body; and
      a venting communication structure that includes:
         a vent hole defined in the spool body and disposed between the second land and the third land;
         a spool fluid channel defined in the spool body to communicate the vent hole and the open top of the first land with each other; and
         a spool notch defined in a lateral portion of the third land to communicate the vent hole with an inside of the spool body.

2. The valve device of claim 1, wherein the holder has the supply port defined therein for supplying the fluid, and a control port defined therein for receiving and discharging the supplied fluid,
   wherein the first land is constructed to control communication between the supply port and the control port,
   wherein the second land is constructed to prevent the fluid supplied from the supply port from entering the solenoid unit.

3. The valve device of claim 2, wherein the spool includes a rod integral with the spool body, wherein the rod extends from a bottom of the third land.

4. The valve device of claim 3, wherein the solenoid unit includes:
   a bobbin;
   a coil wound around the bobbin;
   a core disposed in the bobbin; and
   a plunger disposed in the core;
   wherein the rod contacts the plunger,
   wherein an inner diameter of a portion of the core where the rod is inserted is larger than an outer diameter of the rod.

5. The valve device of claim 4, wherein the plunger has a fluid channel defined therein in a longitudinal direction thereof, wherein a location of the fluid channel is deviated from a center point of a cross section of the plunger.

6. A valve device for controlling an oil pump, the device comprising:
   a valve unit including:
      a hollow holder, wherein the holder has a discharge port defined in a top portion thereof, a control port defined in a middle portion thereof, and a supply port defined in a lower portion thereof, wherein an inner diameter of the middle portion of the holder in which the control port is defined is larger than an inner diameter of the lower portion of the holder in which the supply port is defined; and
      a spool having ring-shaped first and second lands, wherein the first and second lands are vertically spaced from each other and contact an inner face of the holder; and
   a solenoid unit configured for controlling a movement of the spool;
   wherein the spool includes:
      a rod-shaped spool body;
      the ring-shaped first land disposed on a top portion of the spool body, wherein the first land has an open top;
      the ring-shaped second land disposed on a middle portion of the spool body, wherein an outer diameter of the first land is larger than an outer diameter of the second land;
      a ring-shaped third land disposed on a lower portion of the spool body, wherein an outer diameter of the third land is equal to the outer diameter of the second land; and
      a venting communication structure that includes:
         a vent hole defined in the spool body and disposed between the second land and the third land;
         a spool fluid channel defined in the spool body to communicate the vent hole and the open top of the first land with each other; and
         a spool notch defined in a lateral portion of the third land to communicate the vent hole with an inside of the spool body.

7. The valve device of claim 6, wherein the holder has the supply port defined therein for supplying fluid, and the control port defined therein for receiving and discharging the supplied fluid,
   wherein the first land is constructed to control communication between the supply port and the control port, and
   wherein the second land is constructed to prevent the fluid supplied from the supply port from entering the solenoid unit.

8. The valve device of claim 7, wherein the spool includes a rod integral with the spool body, wherein the rod extends from a bottom of the third land.

9. The valve device of claim 8, wherein the solenoid unit includes:
   a bobbin;
   a coil wound around the bobbin;
   a core disposed in the bobbin; and
   a plunger disposed in the core;
   wherein the rod contacts the plunger, and
   wherein an inner diameter of a portion of the core where the rod is inserted is larger than an outer diameter of the rod.

10. The valve device of claim 9, wherein the plunger has a fluid channel defined therein in a longitudinal direction thereof, wherein a location of the fluid channel is deviated from a center point of a cross section of the plunger.

* * * * *